Sept. 13, 1938.　　　　J. BURGH　　　　2,130,066
VEHICLE CONSTRUCTION
Filed Nov. 20, 1936　　　2 Sheets-Sheet 1
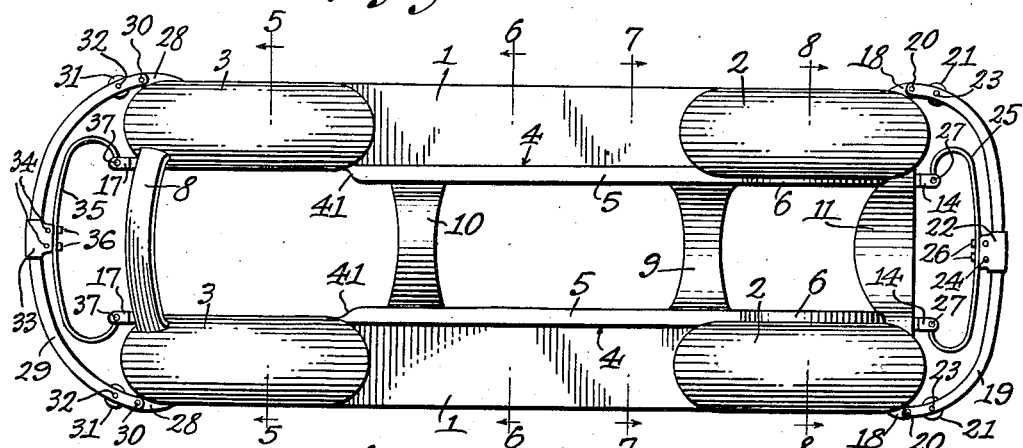
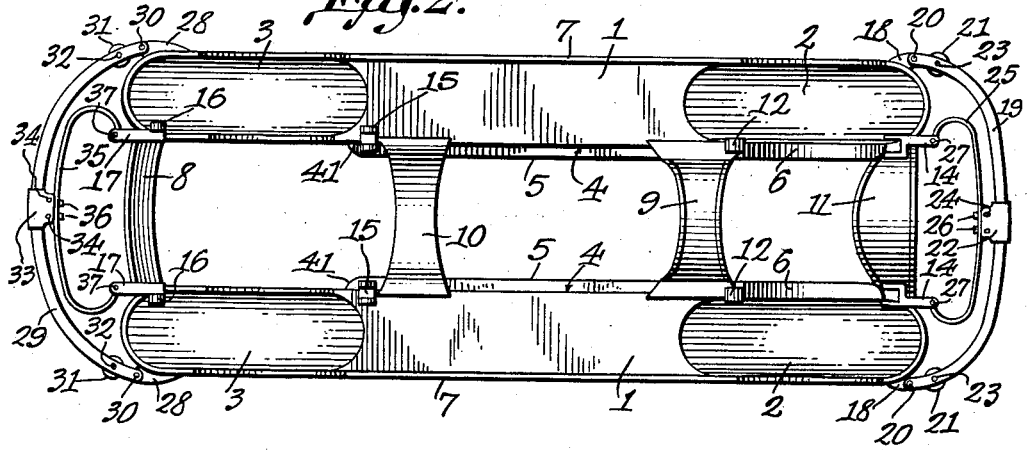
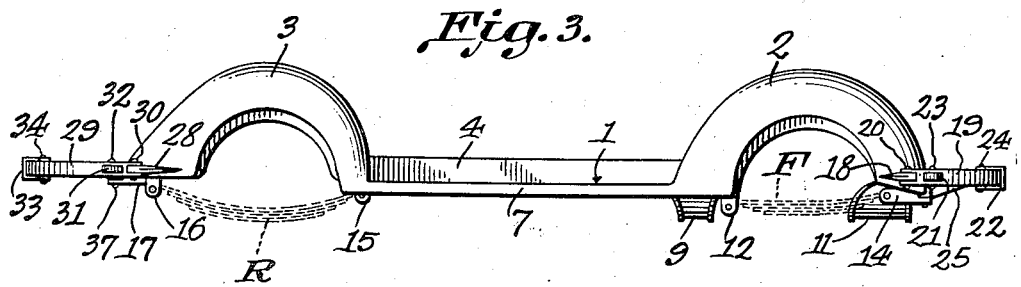
Inventor
John Burgh
By C. A. Snow & Co.
Attorneys Sept. 13, 1938.       J. BURGH       2,130,066
VEHICLE CONSTRUCTION
Filed Nov. 20, 1936       2 Sheets-Sheet 2
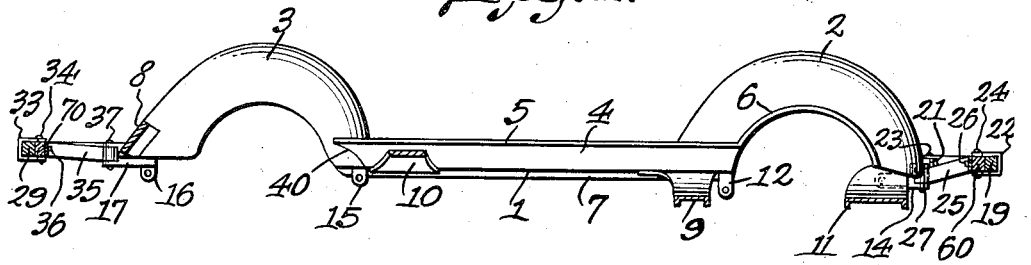
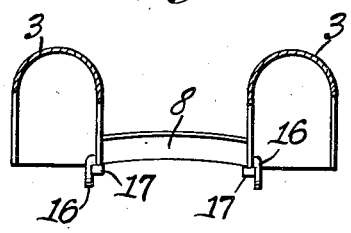
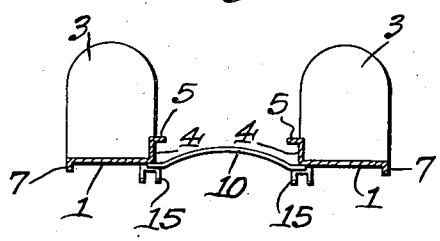
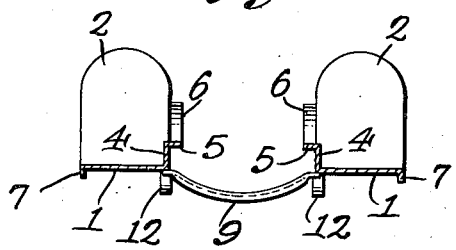
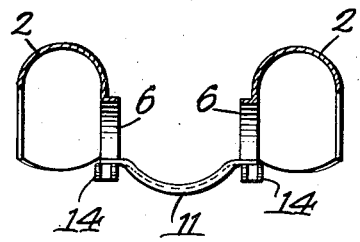
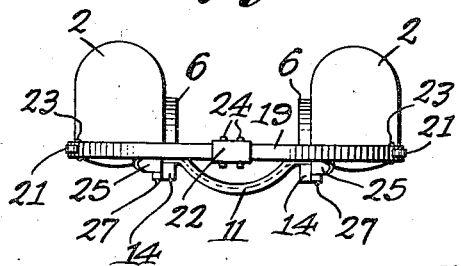
Inventor
John Burgh
By C. A. Snow & Co.
Attorneys Patented Sept. 13, 1938

2,130,066

UNITED STATES PATENT OFFICE 2,130,066

VEHICLE CONSTRUCTION

John Burgh, Denver, Colo.

Application November 20, 1936, Serial No. 111,936

2 Claims. (Cl. 280—106)

This invention aims to provide a novel vehicle construction in which the framework of the vehicle is combined with the running boards, the fenders and the bumpers, to afford great strength. A further object of the invention is so to construct the device that the ends of the bumpers on one vehicle will not hook into and interlock with the ends of the bumpers on another vehicle. The invention aims, moreover, to supply a device of the class described having a minimum number of joints connected by bolts or other equivalent devices, rattling being done away with, and there being fewer separate pieces than heretofore. It is contemplated that the heavy side bars of the chassis frame may be done away with, the heavy metal being carried outwardly into the fenders, and the fenders and the running boards being of strong, one piece construction.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in top plan, a device constructed in accordance with the invention;

Fig. 2 is a bottom plan;

Fig. 3 is a side elevation;

Fig. 4 is a longitudinal section;

Fig. 5 is a cross section on the line 5—5 of Fig. 1;

Fig. 6 is a cross section on the line 6—6 of Fig. 1;

Fig. 7 is a cross section on the line 7—7 of Fig. 1;

Fig. 8 is a cross section on the line 8—8 of Fig. 1;

Fig. 9 is a front elevation.

The device forming the subject matter of this application preferably is made of metal throughout, and comprises parallel oppositely-disposed, horizontal running boards 1. The forward ends of the running boards 1 are joined integrally and firmly to upwardly arched, trough-shaped front fenders 2. The rear ends of the running boards 1 are joined in a like manner to correspondingly-shaped rear fenders 3.

On the inner edges of the running boards 1 there are upstanding flanges 4 (Figs. 7 and 3), which may be denominated inner flanges. The rear ends of the inner flanges 4 are connected as shown at 40 in Fig. 4 to the inner walls of the rear fenders 3, the rear ends of the inner flanges 4 being connected to the inner walls of the rear fenders 3. The upwardly-extended inner flanges 4 have inwardly-extended horizontal lips 5, integrally joined (Fig. 4) to the rear ends of arched, inwardly-extended ribs 6 on the lower edges of the inner walls of the front fenders 2. The rear ends of the lips 5 may be tapered off toward the inner walls of the rear fenders 3, as shown, for instance, at 41 in Fig. 1. The outer edges of the running boards 1 are supplied with depending wings 7 (Figs. 3 and 7). The forward ends of the wings 7 merge into the outer walls of the front fenders 2 (Fig. 3), and the rear ends of the said wings merge into the outer walls of the rear fenders 3.

The inner walls of the rear fenders 3 are connected by a rearwardly and upwardly arched cross piece 8 (Figs. 1 and 5). The cross piece 8 is located near to the rear ends of the rear fenders 3. Near to the rear ends of the front fenders 2, (Fig. 1) the footboards 1 are connected by a downwardly-curved cross piece 9 (Figs. 1 and 7), which may be a channel member (Fig. 2). Adjacent to the forward ends of the rear fenders 3, the running boards 1 are connected by a cross piece 10 (Figs. 1, 2 and 6). The forward portions of the front fenders 2 are joined together by a cross piece 11 (Fig. 1) which is downwardly arched (Fig. 8). The cross piece 11 may be in the form of a channel (Fig. 4).

The ends of the cross piece 9 (Figs. 2 and 7) carry fixed, depending lugs or anchors 12, to which the rear ends of the front springs F (Fig. 3) are attached. Forwardly-extended brackets 14 (Fig. 1) are secured to the ends of the front cross piece 11 (Fig. 8). The rear ends of the brackets 14 are forked, as in Fig. 2, to receive the front ends of the forward springs F of the vehicle. Depending lugs 15 (Figs. 2 and 4) are secured to the running boards 1, near to the forward ends of the rear fenders 3. The lugs 15 constitute places of attachment for the forward ends of the rear vehicle springs R (Fig. 3). Depending lugs 16 (Figs. 2 and 5) are secured to the inner walls of the rear fenders 3, within the said fenders. Rearwardly-extended brackets 17 are formed integrally with the depending lugs 16, the lugs 16 being adapted to carry the rear ends of the rear vehicle springs R.

The outer walls of the forward fenders 2 carry fixed projections 18, to which the ends of a strong forward bumper 19 are attached by securing elements 20. Rotatable members 21, which may be resilient wheels, or wheels peripherally shod with rubber or other resilient material, are located closely adjacent to the rear ends of the forward bumper 19 and are disposed in slots (Fig. 3) formed in the ends of the bumper 19. The wheels 21 are journaled on axle pins 23, mounted in the bumper 19.

A U-shaped yoke 22 is attached by securing elements 24 and a filler block 60 (Fig. 4) to the intermediate portion of the front bumper 19. Behind the front bumper 19 is located a reenforcing member 25, the intermediate portion of which is secured at 26 to the filler block 60 of the yoke 22. The reenforcing member 25 has inwardly extended ends which are secured at 27 to the forward portions of the brackets 14.

The bumper construction at the rear of the vehicle comprises projections 28 secured to the outer walls of the rear fenders 3, corresponding to the projections 18 of Fig. 1. The rear bumper construction is practically like the forward bumper construction and the description may be reduced to a catalogue of parts, wherein the following elements are specified: arched rear bumper 29, securing elements 30, rotatable members 31, axles 32, yoke 33, filler block 70, securing elements 34, reenforcing member 35, securing elements 36 connecting the intermediate portion of the reenforcing member 35 to the filler block 70 of the yoke 35, and securing devices 37 connecting the inwardly-extended ends of the reenforcing member 35 to the rearwardly-projecting brackets 17.

The general construction of the device is such that it will possess great strength, it being possible to dispense with the ordinary side bars of the chassis, the said side bars being replaced by the flanges 4 and the lips 5 of the running boards 1. The fenders 2 and 3 and the running boards 1 are formed in one piece. The fenders 3 are connected securely and firmly by the cross piece 8, the fenders 2 being connected in a like manner by the cross piece 11, and the footboards 4 being connected by the cross pieces 9 and 10.

The bumpers 19 and 29 have no projecting ends, and the end of the bumper on one vehicle cannot hook into and interlock with the end of the bumper on another vehicle. The rotatable elements 21 and 31 receive shocks that are taken by the projecting ends of the ordinary fender, and the rotatable members turn on their respective axles 23 and 32 and produce a glancing impact which will inflict no damage on the fenders of either vehicle in a collision, a blow being directed away from the fenders 2, for instance by the rearwardly-prolonged ends of the bumper 19, said ends extending outwardly and rearwardly with respect to the fenders 2, and being connected thereto by the projections 18 and the securing elements 20.

Having thus described the invention, what is claimed is:

1. In a vehicle frame, running boards disposed in approximately parallel relation at opposite sides of the vehicle frame, front and rear fenders joined integrally to the ends of the running boards, cross pieces connecting the front fenders and cross pieces connecting the rear fenders, brackets carried by the cross pieces and having means for connecting the brackets with vehicle springs, bumpers having curved outer ends connected to the fenders, and bowed springs connected intermediate their ends to the intermediate portions of the bumpers, the ends of the springs being connected to the brackets.

2. A vehicle construction embodying fenders having inner and outer walls, a bumper having curved terminal parts extended longitudinally of the outer walls, means for securing said curved terminal parts to the outer walls, a cross piece connecting the inner walls, a curved reinforcing member located within the curve described by the bumper and having its ends secured to the cross piece, and means for securing the intermediate portion of the reinforcing member to the intermediate portion of the bumper.

JOHN BURGH.